United States Patent [19]

Pohl

[11] Patent Number: 4,851,671

[45] Date of Patent: Jul. 25, 1989

[54] OSCILLATING QUARTZ ATOMIC FORCE MICROSCOPE

[75] Inventor: Wolfgang D. Pohl, Adliswil, Fed. Rep. of Germany

[73] Assignee: International Business Machines Corporation, Armonk, N.Y.

[21] Appl. No.: 164,941

[22] Filed: Mar. 7, 1988

[30] Foreign Application Priority Data

Dec. 5, 1987 [EP] European Pat. Off. ........ 87106899.5

[51] Int. Cl.$^4$ ...................... G01N 23/00; H01J 37/26
[52] U.S. Cl. .................................... 250/306; 250/307; 250/423 F
[58] Field of Search ...................... 250/492.2, 306, 307, 250/423 F, 310, 311; 324/158 R, 158 P, 158 F, 73 PC

[56] References Cited

U.S. PATENT DOCUMENTS 4,343,993  8/1982  Binnig et al. .................... 250/306 X
4,550,257 10/1985  Binnig et al. ................... 250/492.2 X
4,618,767 10/1986  Smith et al. ...................... 250/306 X
4,724,318  2/1988  Binnig ............................. 250/306 X

FOREIGN PATENT DOCUMENTS 0027517  4/1981  European Pat. Off. ............ 250/306

Primary Examiner—Reinhard J. Eisenzopf
Assistant Examiner—Vinh P. Nguyen
Attorney, Agent, or Firm—John J. Goodwin

[57] ABSTRACT

This atomic force microscope includes a pointed tip (1) mounted on top of an oscillating crystal (2) which is translatable in xyz-directions by a conventional xyz-drive (4). A potential applied to a pair of electrodes (5, 6) coated on opposite faces of the crystal (2) causes the latter to oscillate with its resonance frequency. As the tip (1) is approached to a surface to be investigated, the frequency of oscillation of the crystal deviates from its original frequency. This deviation can be used in a feedback loop to control the distance in z-direction of the tip (1) from the surface being investigated and to plot an image of the contour of each scan performed by the tip (1) across the surface.

5 Claims, 1 Drawing Sheet

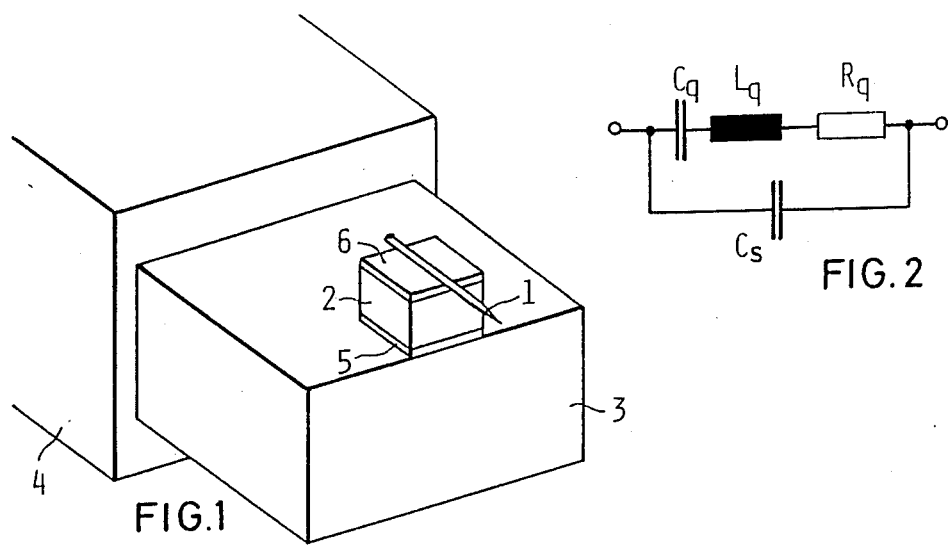
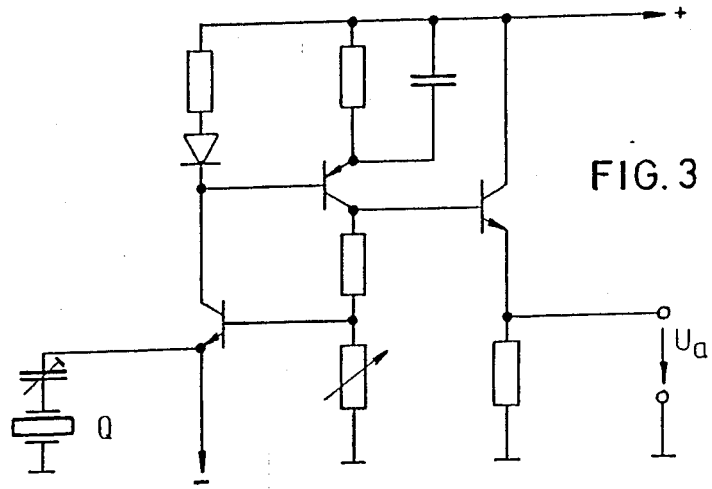
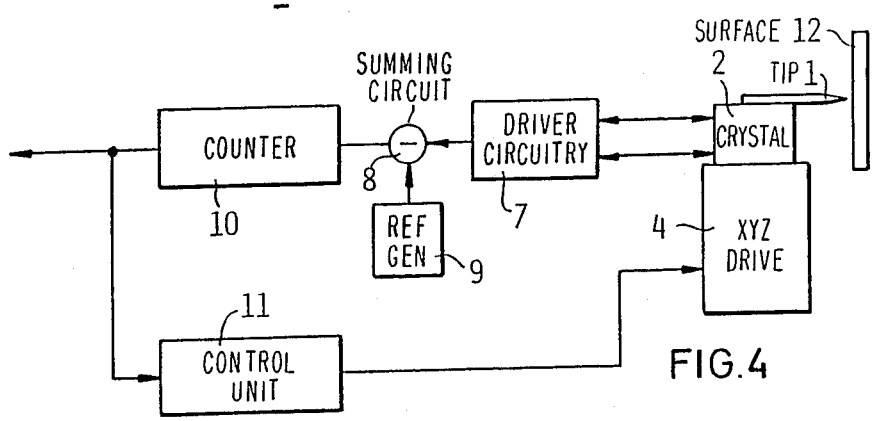

OSCILLATING QUARTZ ATOMIC FORCE MICROSCOPE

BACKGROUND OF THE INVENTION

FIELD OF THE INVENTION

This invention relates generally to Atomic Force Microscopes (AFM) and more particularly to means for measuring the forces and/or deflections occurring during operation of the AFM. The measurement is performed by means of a pointed tip attached to an oscillating quartz crystal.

The Atomic Force Microscope proposed by G. Binnig (EP Appln. No. 86 110 276.2) and described by G. Binnig, C. F. Quate and Ch. Gerber, Phys. Rev. Letters, Vol. 56, No. 9, March 1986, pp. 930–933, employs a sharply pointed tip attached to a spring-like cantilever beam to scan the profile of a surface to be investigated. At the distances involved, attractive or repulsive forces occur between the atoms at the apex of the tip and those at the surface, resulting in tinyl deflections of the cantilever beam. In Binnig's proposal, this deflection is measured by means of a tunneling microscope, i.e., an electrically conductive tunnel tip is placed within tunnel distance from the back of the cantilever beam, and the variations of the tunneling current are used to measure the deflection. With known characteristics of the cantilever beam, the forces occurring between the AFM tip and the surface under investigation can be determined.

The forces occurring between a pointed tip and a surface are usually described as vander-Waals forces, covalent forces, ionic forces, or repulsive core interaction forces. The energies involved in the atomic distance approach of a single atom (at the apex of the tip) to a surface are the range of $E_0 = 0.01 \ldots 10 \, eV = 10^{-22} \ldots 10^{-18}$ Joule. The corresponding distances are in the subnanometer range of $x_0 = 10 \ldots 1000 \pm = 0.01 \ldots 1$ nm. The respective forces, i.e., the first derivatives of the potential function, therefore, are in the range of $K_0 = 10 \, nN \ldots 10 \, nN$. The resulting atomic "spring constants', i.e., the second derivatives of the potential function are in the range of $C_0 = 100 \ldots 0.01 \, N/m$. These data can be deduced from surface studies and many other sources, such as the values of elastic constants.

It is one object of the present invention to describe a force measuring device which may be used as an atomic force microscope, but which does not employ cantilever beams nor tunneling for detection.

Accordingly, the present invention proposes an atomic force microcope comprising a pointed tip provided for interaction with a surface to be investigated and means for approaching said tip to said surface to within a working distance on the order of one tenth of a nanometer, and for scanning said tip across said surface in a matrix fashion. This atomic force microscope is characterized in that said tip is attached to one surface of an oscillating body carrying, on opposite sides thereof, a pair of electrodes permitting an electrical potential to be applied, that, in operation and with said tip remote from said surface, said body is excited to oscillate at its resonance frequency, and that, with said tip maintained at said working distance from said surface, said body osillates at a frequency deviating in a characteristic manner from said resonance frequency, that said deviation is compared with a reference signal, and that the resulting differential signal is passed through a feedback loop to control said means for approaching the tip to said surface.

Details of one embodiment of the invention will be described by way of example in the following description and with reference to the drawings in which:

FIG. 1 represents an embodiment of the force measuring device in the form of a quartz crystal oscillator;

FIG. 2 is an equivalent circuit of the quartz oscillator of FIG. 1;

FIG. 3 shows a circuit diagram for the quartz oscillator circuit of FIG. 1;

FIG. 4 is a schematic diagram of the control circuitry of the quartz oscillator.

Referring to FIG. 1, there is shown an atomic force measurement device comprising a pointed tip 1 mounted on one of the vibrating surfaces of a small Y-cut quartz crystal 2. In its 'isolated' position, quartz crystal 2 can be excited to oscillate with its resonance frequency. When tip 1 is brought sufficiently close to a sample surface, the atomic forces operating between the atom at the apex of tip 1 and one or more of the surface atoms will cause a detectable shift in resonance frequency, as well as the generation of higher harmonics of the excitation frequency. It can be shown that the resulting sensitivity is comparable to that of the atomic force microscope of EP (Appln. No. 86 110267.2). Quartz crystal 2 is mounted on a substrate 3 which in turn is fixed to a conventional xyz-drive 4. The height, width and length dimensions of quartz crystal 2 are preferably all about 0.1 mm. The crystal can be fabricated by conventional etching and polishing techniques (lithography). The sample to be investigated (not shown) may be approached to tip 1 by means of a coarse translation unit known in the art.

A voltage applied to electrodes 5 and 6, respectively, coated upon two opposite surfaces of crystal 2 will cause the crystal to perform a shear motion in x-direction. The elastic forces associated with this motion can be characterized by a (static) spring constant $C_e$ $$C_e = \frac{c_{66} \, wl}{h} \approx 4 \cdot 10^6 \, N/m,$$

where $C_{66} = 4 \cdot 10^{10} \, N/m^2$ is the modulus of elasticity for the particular cut of crystal 2, in accordance with V. E. Bottom, "Quartz Crystal Unit Design", D. Van Nostrand 1982, and $w = l = h = 0.1$ mm. AC excitation of crystal 2 creates an oscillatory motion of the tip normal to the sample surface. The resonances of the Y-cut crystal (without tip/surface interaction) occur at $$\nu_n \approx 2000[mHz] \frac{(2n - 1)}{h}.$$

With $h = 0.1$ mm, the fundamental frequency is $\nu_1 = 20$ MHz.

The equivalent circuit for the quartz oscillator of FIG. 1 is shown in FIG. 2. $C_s$ is the unavoidable stray capacitance which is large compared to the capacitance $C_q$ associated with the quartz crystal itself. $L_q$ and $R_q$ are respectively the inductance and resistance of the crystal. When incorporated in a circuit of the type shown in FIG. 2, the oscillator is excited at its serial resonance frequency $\nu_1$:

$$\nu_1 = \frac{1}{2\pi}\sqrt{L_q C_q}$$

which is determined by the properties of the quartz alone, and independent of the stray capacitance $C_s$.

At a distance of about 1 to 0.1 nm from the sample surface, tip 1 starts interacting detectably with the sample. The atomic potential superimposes upon the elastic potential of the oscillator. Said elastic potential is an even function of the excursion $s_x$ of tip 1 along the x-direction. The atomic potential has no symmetry with respect to the origin of the displacement; it may be, for example, an exponentially increasing repulsion:

$$E_{at} = E_0 e^{s_x/x_0}$$

$$K_{at} = K_0 e^{s_x/x_0}$$

$$C_{at} = C_0 e^{s_x/x_0}$$

Herein, $E_{at}$ is the atomic potential, $K_{at} = dE_{at}/ds_x$ is the atomic force, $C_{at}$ is the force constant and $x_0$ is the characteristic distance of repulsion. A series expansion of the atomic force $K_{at}$ yields $$K_{at} = K_0 + C_0 s_x + \left(\frac{K_0}{2x_0^2}\right) s_x^2 + \ldots$$

$K_{at}$ is small compared to the elastic force, creating a perturbation only. The power series shows the following effects of the atomic force:

$O(x^0)$: Static Force $K_0$, creates static displacement $K_0/C_e$ which is too small for detection.

$O(x^1)$: Renormalization of spring constant $$C_e \rightarrow C_e + C_0$$

resulting in a shift of the resonance frequency.

$O(x^2)$: Source term for second harmonic generation:

$$K^{(2)} = \left(\frac{K_0}{2x_0^2}\right) s_x^{(1)2},$$

where (1) and (2) indicate the amplitudes at the fundamental and second harmonic frequencies, respectively.

Turning now to the atomic force detection through a shift of the resonance frequency. The quartz crystal together with the conventional circuitry of FIG. 3 forms an oscillator whose resonance frequency changes owing to the atomic interaction. The ensuing frequency shift can easily be detected with commerically available electronic counters. FIG. 4 is a schematic circuit diagram showing the connection of crystal 2 with its driver circuitry 7, i.e., the one shown in FIG. 3, to one input of a summing circuit 8 the other input of which is connected to a reference frequency generator 9. The output of summing circuit 8 is connected to a counter 10 which is designed to deliver an analog output signal representative of the force-induced variation of the resonance frequency of crystal 2 as it approaches surface 12 to be investigated. The output signal of counter 10 is also supplied to a control unit 11 which controls the movements of xyz-drive 4 and, hence, of tip 1.

For a counter with assumed resolution of 2 parts in $10^9$ and an integration time of 1 second, using the method of "inverted counting", the resulting force sensitivity of $K_{min}$ is:

$$K_{min} = \left(\frac{\Delta \nu}{\nu_1}\right) C_e x_0.$$

For $x_0 = 0.1$ nm, $K_{min} = 2 \cdot 10^{-12}$ N. This is sufficient to detect even very weak atomic interactions. The output signal of the counter can be used to control the average tip position in accordance with the circuit diagram of FIG. 2.

The observation time $t_g$ is 1 second for $K_{at} = K_{min}$. Above the noise level, $t_g$ is linearly proportional to $1/K_{at}$. Stronger interactions in the range of 100 to 1000 pN, therefore, can be detected within 1 to 10 ms.

The absolute value of the frequency shift is independent of the resonance frequency since both, $\nu_1$ and $C_e$ scale with $1/h$. The resulting shift $\Delta \nu$ is:

$$\Delta \nu \approx 2000[mHz]\, C_0/c_{66} wl = 5 \left[ Hz/\frac{N}{m} \right],$$

for $w = l = 0.1$ mm. $C_0 = 0.01$ to 100 N/m hence provides $\Delta \nu = 0.05$ to 500 Hz.

An alternative way of atomic force detection is by second harmonic generation. The term $O(x^2)$ in the above expansion creates a force term $K^{(2)}$ at twice the excitation frequency. This force causes a secondary oscillation of quartz crystal 2 which in turn creates a second harmonic voltage signal at electrodes 4 and 5. The signal is proportional to the second derivative of the atomic force versus distance. In order to make this signal large, one chooses $\nu = \nu_1/2$, such that the second harmonic excites the fundamental resonance of quartz crystal 2. The amplitude becomes $s_x^{(2)} = K^{(2)} Q/C_e$, with Q being the quality factor of the quartz oscillator, typically on the order of $10^5$. Because of this large value, $s_x^{(2)}$ typically is only two orders of magnitude smaller than $s_x^{(1)}$. The respective induced charge is of the order of $10^{-16}$ Coulomb, resulting in a current of 10 nA at 10 MHz.

The induced voltage depends on the stray capacitance. Assuming $C_s = 4$ pf, one arrives at $U^{(2)} = 0.1$ $\mu$V. The power $U^{(2)} \cdot I^{(2)}$ amounts to $10^{-14}$ W. The respective thermal noise power for a bandwidth of 100 Hz is $10^{-18}$ W. The second harmonic signal hence, also can be detected and used for atomic force measurements.

The Y-cut for crystal 2 was chosen in this example only because it allows for particularly simple calculations, but it is not optimal for thermal stability AT-, BT-, and SC-cuts permit oscillators with considerably smaller thermal drifts. Mounting of those is, however, more difficult since the crystal base in general is not a nodal plane. Accordingly, the crystal support requires a more sophisticated design.

The electronic counter used for the frequency shift determination should preferably employ an external reference oscillator mounted in juxtaposition with crystal 2.

While FIG. 1 shows tip 1 mounted on top of crystal 2, the tip may advantageously also be incorporated into crystal 2 so as to form an integral part of the crystal. Those skilled in the art will appreciate that quartz crystal 2 may be subjected to a conventional etching operation to produce a tip protruding from one of the crystal's surfaces.

for certain applications it may be advantageous to replace the quartz crystal by other piezoelectric materials.

Having thus described my invention, what I claim as new, and desire to secure by Letters Patent is:

1. Atomic force microscope comprising a pointed tip (1) provided for interaction with a surface (12) to be investigated and means (4) for approaching said tip (1) to said surface (12) to within a working distance on the order of one tenth of a nanometer, and for scanning said tip (1) across said surface (12) in a matrix fashion, characterized in that said tip (1) is directly attached to one surface of an oscillating body (2) carrying, on opposite sides thereof, a pair of electrodes connected to an oscillator driver circuit (7) permitting an electrical potential to be applied, that, in operation, and with said tip (1) remote from said surface (12), said body is excited to oscillate at its resonance frequency and to cause said tip directly attached thereto to move with an oscillatory motion normal to said surface, and that, with said tip (1) maintained at said working distance from said surface 12), said body oscillates at a frequency deviating in a characteristic manner from said resonance frequency as a result of oscillatory motion of said tip, that said deviation is combined with a reference signal (9) by a summing circuit (8) to produce a differential signal representative of said deviation of said oscillating frequency from said resonance frequency, and that the resulting differential signal is passed through a feedback loop (10, 11) to control said means (4) for approaching the tip (1) to said surface (12).

2. Atomic force microscope in accordance with claim 1, characterized in that said oscillating body (2) is a quartz crystal arranged on top of a substrate (3) which extends from said means for approaching (4), said quartz crystal (2) carrying said pair of electrodes (5, 6) at opposite surfaces thereof which are connected to said oscillator driver circuit 7 to provide a quartz oscillator (2,7), that said oscillator driver circuit (7) is connected to supply an output signal to one input of said summing circuit (8) the other input of said summing circuit (8) is connected to a reference frequency generator (9), that the output of said summing circuit (8) is connected to said feedback loop including a counter (10) which is adapted to supply an analog output signal representative of the variation of the resonance frequency of said quartz oscillator (2, 7) and a control unit (11) which in turn is connected to said means for approaching (4).

3. Atomic force microscope in accordance with claim 1, characterized in that said oscillating body (2) is a quartz crystal having said tip (1) directly attached thereto as an integral part of said crystal (2) protruding from one of its surfaces.

4. Atomic force microscope in accordance with claim 1, characterized in that said oscillating body (2) is a piezoelectric element other than quartz arranged on top of a substrate (3) which extends from a said means for approaching (4), said piezoelectric element (2) carrying a pair of electrodes (5, 6) at opposite surfaces thereof which are connected to said oscillator driver circuit (7), that said oscillator driver circuit (7) is connected to supply an output signal to one input of said summing circuit (8) the other input of said summing circuit (8) is connected to said reference frequency generator (9), that the output of said summing circuit (8) is connected to a counter (10) which is adapted to supply an analog output signal representative of the variation of the resonance frequency of the piezoelectric element (2) to a control unit (11) which in turn is connected to said means for approaching (4).

5. Atomic force microscope in accordance with claim 1, characterized in that said oscillating body (2) is mounted on means or approaching (4), said oscillating body (2) carrying a pair of electrodes (5,6) at opposite surfaces thereof which are connected to said oscillator driver circuit (7), that said oscillator driver circuit (7) is connected to supply an output signal to one input of said summing circuit (8) the other input of said summing circuit (8) is connected to said reference frequency generator (9), that the output of said summing circuit (8) is connected to a counter (10) which is adapted to supply an analog output signal representative of the variation of the resonance frequency of said oscillating body (2) to a control unit (11) which in turn is connected to said means for approaching (4).

* * * * *